United States Patent
Pong et al.

(10) Patent No.: US 8,239,764 B2
(45) Date of Patent: Aug. 7, 2012

(54) SYSTEM AND METHOD FOR SELECTION OF CONTENT SOURCE UPON DEVICE POWER-ON

(75) Inventors: Chung Shun John Pong, Costa Mesa, CA (US); Byung Chan Kang, Downey, CA (US); Shiang Feng Lee, San Jose, CA (US); Fei Xie, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1114 days.

(21) Appl. No.: 11/711,301

(22) Filed: Feb. 27, 2007

(65) Prior Publication Data

US 2008/0216122 A1 Sep. 4, 2008

(51) Int. Cl.
*G06F 17/00* (2006.01)

(52) U.S. Cl. .................................................. 715/273
(58) Field of Classification Search .................. 715/273
See application file for complete search history.

(56) References Cited

U.S. PATENT DOCUMENTS

| | | | |
|---|---|---|---|
| 5,585,865 A | 12/1996 | Amano et al. | |
| 5,798,785 A | 8/1998 | Hendricks et al. | |
| 5,867,226 A | 2/1999 | Wehmeyer et al. | |
| 6,697,607 B1 * | 2/2004 | Smith et al. | 455/185.1 |
| 7,017,172 B2 | 3/2006 | Schaffer et al. | |
| 7,140,032 B2 | 11/2006 | Dew et al. | |
| 2002/0164999 A1 * | 11/2002 | Johnson | 455/456 |
| 2003/0110490 A1 * | 6/2003 | Dew et al. | 725/37 |
| 2006/0282862 A1 | 12/2006 | Dew et al. | |
| 2007/0133952 A1 * | 6/2007 | Park et al. | 386/112 |
| 2007/0220150 A1 * | 9/2007 | Garg | 709/226 |
| 2007/0277196 A1 * | 11/2007 | Steengaard et al. | 725/37 |

OTHER PUBLICATIONS

Nakajima et al., A Software Infrastructure for Supporting Spontaneous and Personalized Interaction in Home Computing Environments, Springer-Verlag London,Pers Ubiquit Comput vol. 10, Nov. 10, 2005 p. 379-391.*

* cited by examiner

*Primary Examiner* — Laurie Ries
*Assistant Examiner* — Frank D Mills
(74) *Attorney, Agent, or Firm* — Beyer Law Group LLP (57) ABSTRACT

A system and method for determining which program to display from multiple content sources at a power-on event of a content display device at a certain location is disclosed. In one embodiment, the method includes receiving metadata containing content information about multiple programming available from multiple content sources on an integrated network. The content information can be analyzed so as to determine if any of the programming satisfies rules pertaining to programming appropriate for the location of the display device within a home. The content information can be analyzed in advance such that when a power-on command is received at the content display device, a program that has been determined to satisfy the rules is displayed on the display device.

25 Claims, 5 Drawing Sheets

SYSTEM AND METHOD FOR SELECTION OF CONTENT SOURCE UPON DEVICE POWER-ON

BACKGROUND OF THE INVENTION

1. Field of the Invention

The present invention relates to displaying content on a content display system, and in particular, to determining content to display upon a power-on event in a network including multiple content sources.

2. Description of the Related Technology

Content display devices, such as a televisions, typically display the program that is currently being played on the channel that was being displayed when the display device was turned off. The content that is displayed when the display device is powered on may not be content that is desired. For example, if a television is tuned to the nightly news and turned off at 7 pm, and then turned on at 3 am, the displayed content will most likely not be desired content.

Some systems give a user more power-on options such as a pre-selected channel. However, these systems are typically not adaptive to what is currently available. These systems are also not designed for multiple content sources available in current integrated home or business networks.

Some systems have provisions that provide additional automation of content determination at time of power-on events. These systems may attempt to ease access to content based on a single content source by utilizing the source supplied electronic program guide (EPG) data. This also does not consider the networked environment where multiple content sources are available.

Some systems attempt to identify an individual user and have rules of content selection dependent on the user's identity. These systems may use complex methods of user identification in order to narrow down content that the individual user may be most interested in. However, mere presence of a certain user at a certain location may not mean that this user's desired content is appropriate for other viewers present at the time the display device is activated. For example, if an adult user turns on a display device in a child's bedroom, the content that is displayed may be appropriate for the adult user, but not the child that is also present. What is needed are methods and systems for determining content to be displayed at a power-on event that take into account one or more factors such as multiple content sources, display device location and time of day.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the sample features of this invention provide advantages that include display of desirable subject matter on display devices depending on location.

One aspect is a method of determining content to display on a content display device at a power-on event. The method includes receiving content information associated with a plurality of programs that can be received, and receiving location information representative of the location of a content display device in a home. The method further includes analyzing the content information so as to determine whether one or more of the programs satisfies a set of one or more rules, where the set of rules pertain to content appropriate for display at the location of the content display device, receiving a power-on signal at the content display device; and in response to receiving the power-on signal, displaying one of the programs determined to satisfy the set of rules to the content display device.

Another aspect is a system for determining content to display on a content display device at a power-on event. The system includes a content display device configured to display audiovisual data, and a receiver configured to communicate with the content display device and to receive content information associated with a plurality of programs that can be received over a home network interface. The system further includes a content selection subsystem configured to communicate with the receiver, to receive location information representative of the location of the content display device in a home, and to analyze the content information so as to determine whether one or more of the programs satisfies a set of one or more rules pertaining to content appropriate for display at the location of the content display device, where the receiver is further configured to receive a power-on signal associated with the content display device, and, after receiving the power-on signal, to communicate a programs that satisfies the set of rules to the content display device.

DETAILED DESCRIPTION OF CERTAIN INVENTIVE EMBODIMENTS

Certain embodiments provide a method and system for communication of multimedia content including audio and/or video information from a plurality of content sources to a plurality of content display devices over an integrated home network.

The following detailed description is directed to certain sample embodiments of the invention. However, the invention can be embodied in a multitude of different ways as defined and covered by the claims. In this description, reference is made to the drawings wherein like parts are designated with like numerals throughout.

Systems and methods of improving selection of audiovisual (multimedia) programming to display on a content display device upon reception of a power-on signal at the content display device are discussed below. Multimedia programming (herein simply referred to as programming or programs)

may include one or more of video data, audio data, text data, image data or any other form of media content. The programming may be in a compressed format, or an uncompressed format as well as analog or digital formats. Content to display on a content display device is determined at a power-on event. In one aspect, the content is determined to satisfy a set of rules governing the type of content that is appropriate to display on the content display device. In one embodiment, the rules pertain to content appropriate for a content display device located in a specific room of a house or building. Other embodiments include rules pertaining to content appropriate for displaying on the content display device at various times of day.

Figure 1:
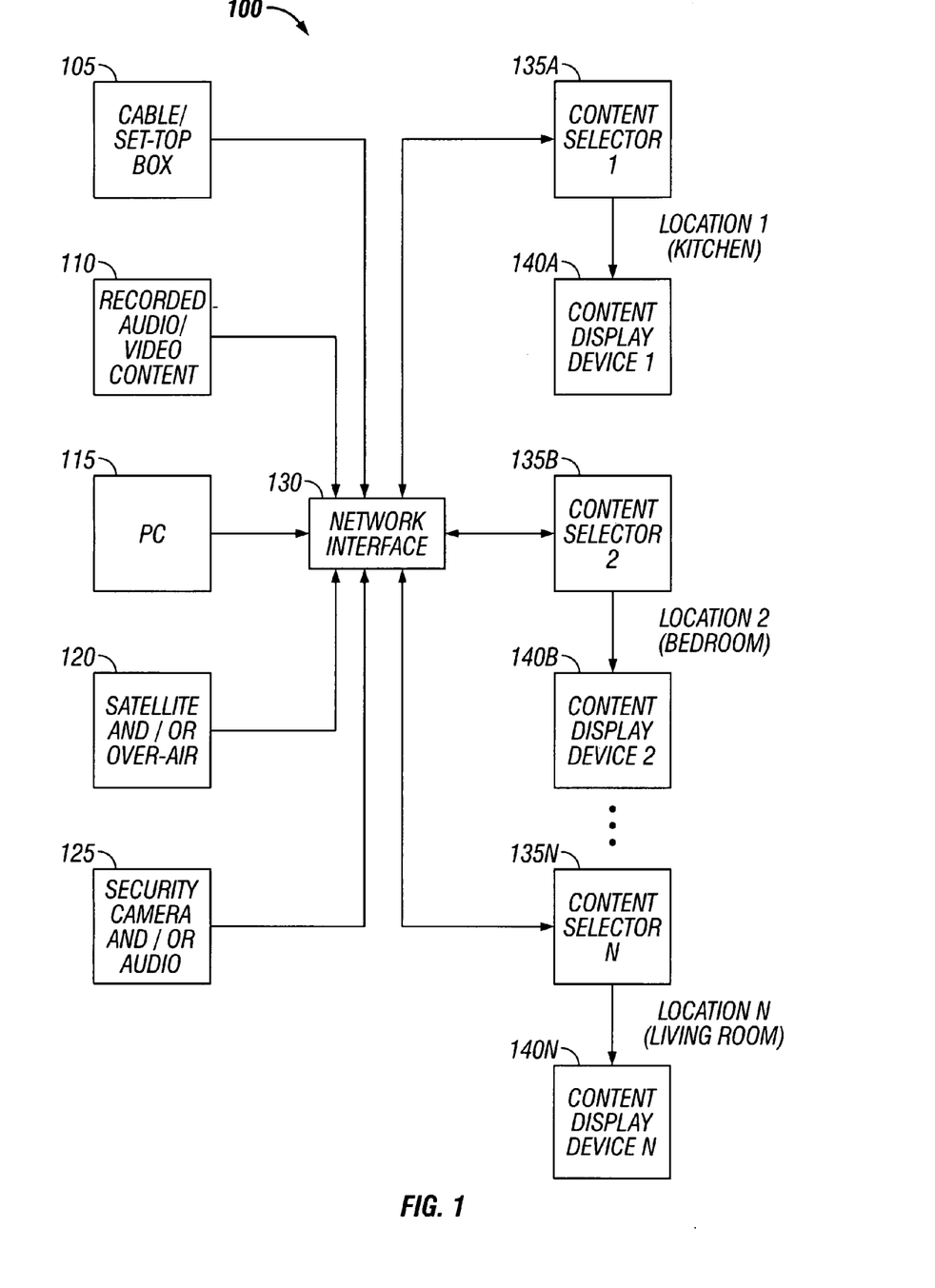
FIG. 1 is a functional block diagram of a network that implements communication of content between source devices and display devices according to certain embodiments.

Example implementations of the embodiments in an integrated multimedia content communication network will now be described. FIG. 1 is a functional block diagram of a network 100 that implements communication of content between source devices and display devices according to certain embodiments. The network 100 may include wireless and/or wired links between devices. The network 100 may be a home network in a residence, a business network in a place of business, or any type of network with one or more content sources and one or more content display devices located over a geographical area of any size.

The network 100 includes multiple sources of content including a cable connection 105 such as a set-top box, a recorded content device 110 that may include pre-recorded audio and/or video, a personal computer 115 with content stored on the disk-drive or other memory, a satellite dish and/or over-the-air antenna 120, and a security system 125 including video cameras and/or audio sensors. Of course, other known content sources may also be included in the network 100.

The content sources 105 to 125 are connected to a network interface 130. The network interface provides a central location where all content sources in the network can be accessed in order to access their respective programs. The network interface 130 may be any one or a combination of an Ethernet interface, a 1394 connection interface, and/or a USB connection interface.

The network 100 also includes multiple content selector devices 135A to 135N and multiple content display devices 140A to 140N. Each of the content selector devices 135A to 135N can receive multiple programs from the content sources 105 to 125 via the network interface 130. In addition to receiving the programs, the selector devices 135A to 135N can receive content information, or metadata, about the programs available to be received on the content sources 105 to 125. In the embodiment shown, each of the content selectors 135A to 135N are configured to communicate with the content display devices 140A to 140N, respectively. The content display devices can be any of several display devices for displaying video, still images, audio or any combination thereof. The content display devices 140 are located in different rooms of a building, in the embodiment shown. For example, the content display device 135A is located in a kitchen, the content display device 135B is located in a bedroom and the content display device 135N is located in a living room. The content selector devices 135A to 135N are configured to analyze the content information received from the multiple content sources and to determine which program to display on the associated content display device 140A to 140N. Details of the methods and systems used by the content selectors 135A to 135N to determine which programs to display will be described below.

In the network 100 depicted in FIG. 1, each content selector 135 is associated with a single content display device 140. In other embodiments, multiple content display devices 140 can be associated with a single content selector 135. The content selector device 135 may be part of a single device containing the content display device 140. In some embodiments, the content selector device 135 and/or the content display device 140 may include one or more content sources such as the content sources 105 to 125. In these embodiments, the content from the content source included in the content selector device 135 and/or the content display device 140 may be communicated to other content selectors 135 over the network 100 via the network interface 130, for example.

Figure 2:
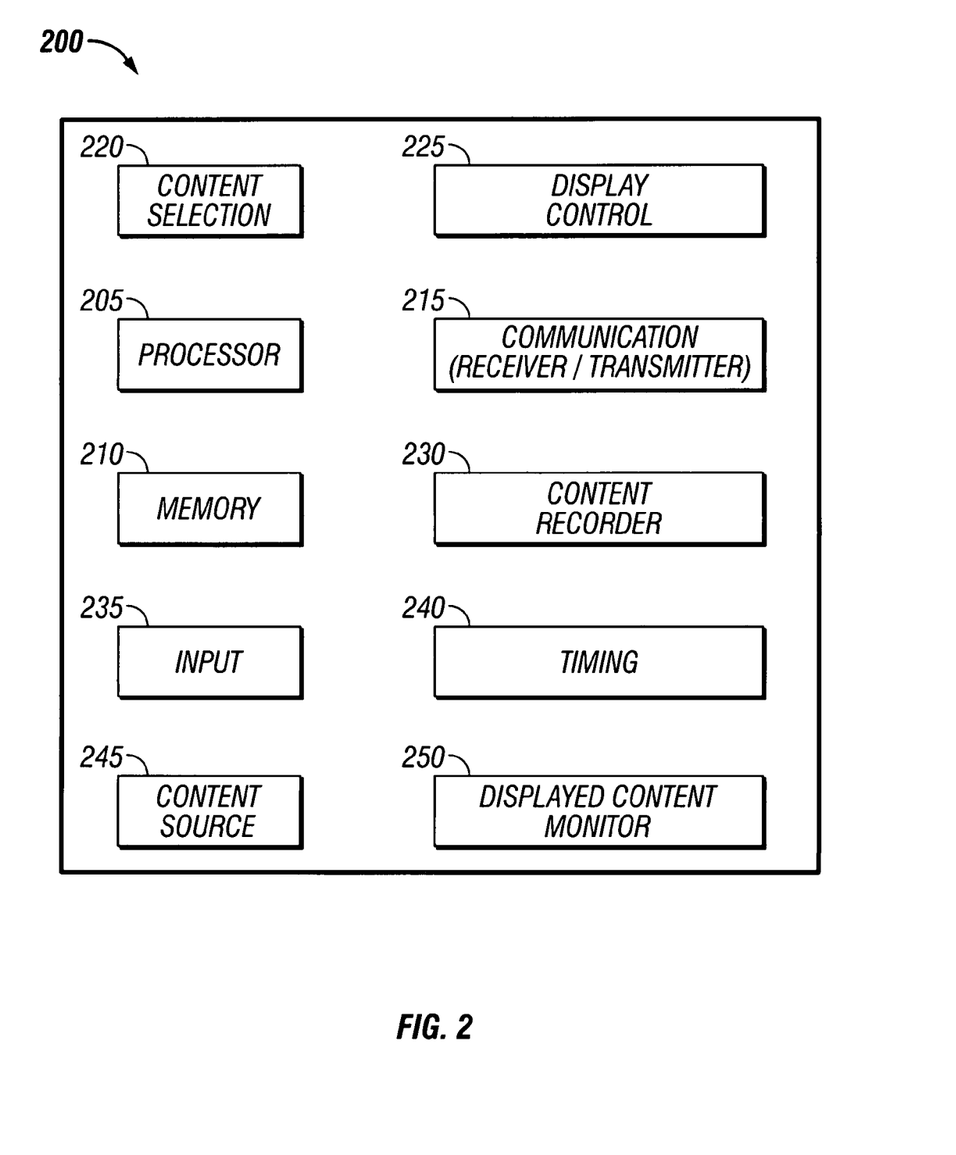
FIG. 2 is a block diagram illustrating an embodiment of a content selector device that may be used in a network such as illustrated in FIG. 1.

FIG. 2 is a block diagram illustrating an embodiment of a content selector device 200 that may be used in a network such as illustrated in FIG. 1. The content selector device 200 comprises a processor element 205, a memory element 210, a communication element 215, a content selection element 620, a display control element 225, a content recorder element 230, an input element 235, a timing element 240, a content source 245 and a displayed content monitor 250. The processor 205 may include one or more of a general purpose processor and/or a digital signal processor and/or an application specific hardware processor. The memory 210 may include, for example, one or more of integrated circuits or disk based storage or any readable and writeable random access memory device. The processor 205 is coupled to the memory 210 and the other elements to perform the various actions of the other elements. In reference to FIG. 1, the communication element 215 receives data from the content sources 105 to 125 via the network interface 130 as well as from the content source 245. The content source 245 may be integrated with the content selector device 200 as shown or with one of the display devices 140, or it may be a peripheral device associated with the content selector device 200 or one of the display devices 140. In some embodiments, the content source 245 comprises one of the content sources 105 to 125. The communication element 215 also communicates (transmits) data to be displayed (presented) on the content display devices 140. The communication element 215 can be configured to utilized wireless and/or wired channels.

The content selection element 220 analyzes content information describing the various programs that are available over the network interface 130 (see FIG. 1) to be displayed. The content selection element 220 receives input in the form of rules, in one embodiment, that are used to guide the analysis of what to display upon receipt of a power-on command associated with the display device. The rules may be used to determine what programs are appropriate for display on the content display device depending on location. The rules may also be a function of the time of day as may be provided by the timing device 240.

The input element 235 is used, in some embodiments, to configure the rules that are used to determine programming appropriate for a given content display device location and/or time. The input element 235 may be a graphical user interface that a user utilizes to personalize the rules. Details of a method for selecting a set of rules are discussed below in reference to FIG. 4.

The display control element 225 is configured to control various aspects of the content display device that the content selector device 200 communicates with. The display control element may be used to enable or disable the display device at certain times of day.

The display content monitor 250 is configured to monitor the program being displayed on the content display device 140 that is associated with the content selector device 200. The display device can be monitored to identify when a channel change command or a turn-off command is initiated by a user. Channel change commands and turn-off commands can be an indication that the content that was selected by the content selection element 220 was not content that was desired by the user. Information representing or describing the type of content being displayed after a detected channel change or turn-off event can be store and used to modify the rules used for analyzing the content to be displayed in the future. The stored information can be communicated over the network 100 via the network interface 130 to other content selector devices. In this way, the other content selector devices can modify the rules used to select content in the future.

In some embodiments, one or more of the elements of the content selector 200 of FIG. 2 may be rearranged and/or combined. The elements may be implemented by hardware, software, firmware, middleware, microcode or any combination thereof. Details of the actions performed by the elements of the content selector 200 will be discussed in reference to the methods illustrated in FIGS. 3 and 4 below.

Figure 3:
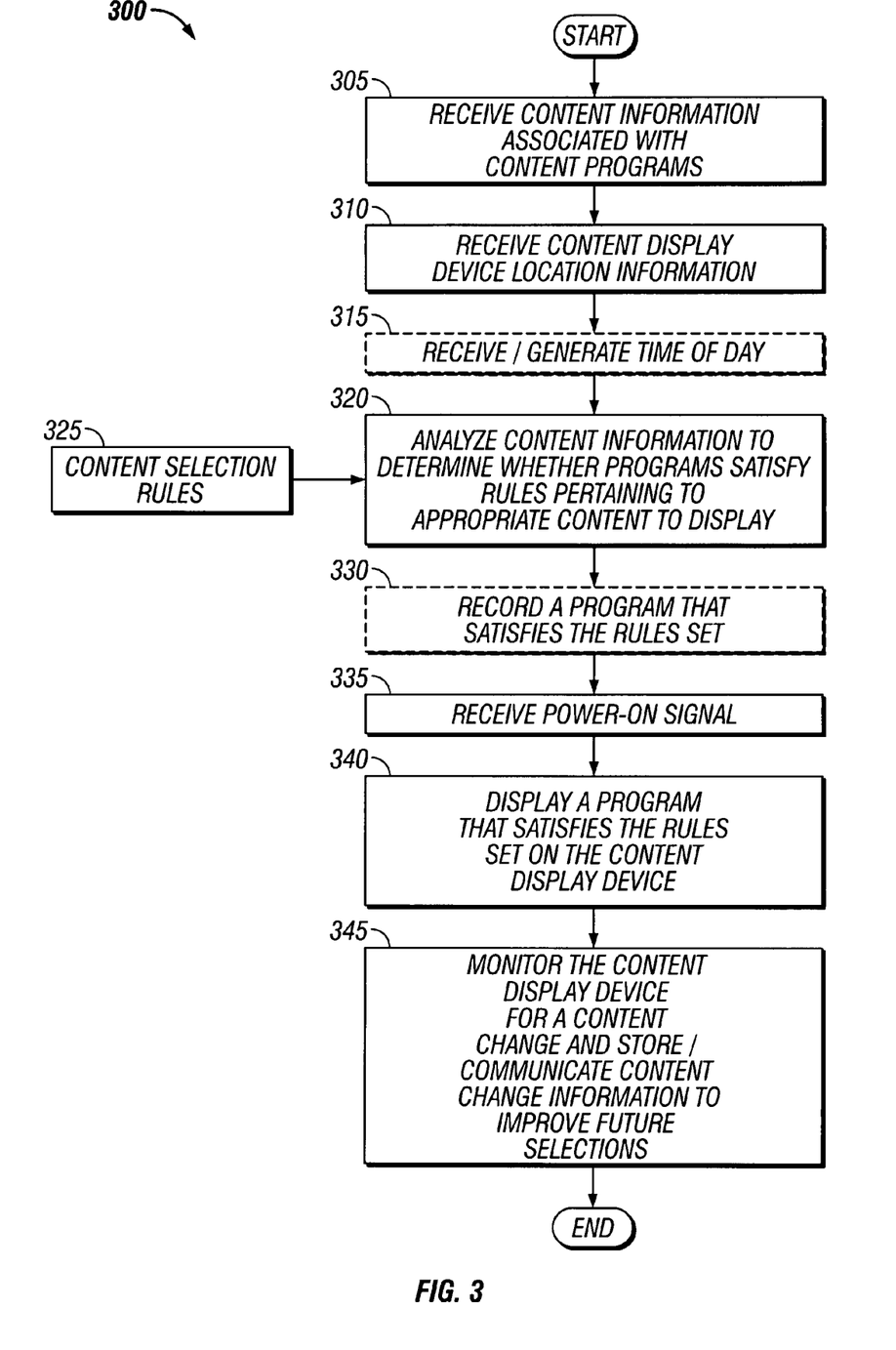
FIG. 3 is a flowchart illustrating an example of a method of determining content to display on a content display device at a power-on event in a network such as illustrated in FIG. 1.

FIG. 3 is a flowchart illustrating an example of a method 300 of determining content to display on a content display device at a power-on event in a network such as illustrated in FIG. 1. The method 300 may be performed by a device such as the content selector 200 shown in FIG. 2. The method 300 starts at block 305 where content information, also known as metadata, associated with multiple programs is received. The content information may be similar to the information contained in an electronic program guide. The content information may include a program theme, time available, title, channel, genre, etc. The content information may be broadcast over a cable or satellite network or transmitted in sideband information using the vertical blanking interval. Content information may also be aggregated by third party suppliers of metadata. The content information may include program content currently being shown as well as content available up to several days or more in the future. In one aspect, the content information contains intrusion alerts from a security system such as the security system 125 shown in FIG. 1. The content information may be received through the network interface 130 as shown in FIG. 1 where multiple content sources 105 to 125 are available. Each content source 105 to 125 may provide content information associated with the content that is available from the source. Radio content information may include musical artist, music style (rock, pop, rap, classical, etc.), title, album name, etc. The functions at block 305 may be performed at all times whether or not a program is being displayed on a display device associated with the content selector that is performing the method 300. The data collection at block 305 may be performed continuously, at predetermined intervals, or at predetermined times such as prior to each half hour when content is most likely to change. The communication element 215 of the content selector 200 may perform the functions at block 305.

The data received at block 305 may be in standard formats, such as XML, which may be parsed by the content selection element 220. In some embodiments, the content selector 200 may receive the content information at block 305 from the content display device if it is connected with a media source or a network. The display control element 225 may be used to interface with the display device in these embodiments.

The method 300 continues at block 310 where content display device location information is received. The location information may be input by a user when a display device is first activated in a location. The location information may identify a type of room where the device is located such as a kitchen, bedroom, etc. The location information may also be obtained by a position determination system such as a GPS device or a proximity detector. The input element 235 of the content selector 200 may perform the functions at the block 310.

In some embodiments, an optional block 315 may be performed where a time of day is received or generated. The time of day may be used to further limit program content that may be displayed on the content display device. Details of methods for using time of day to select the rules used to determine which program to display are discussed below in reference to FIG. 4. The timing element 240 of the content selector 200 may perform the functions at the optional block 315.

After receiving the location, and optionally, the time of day information at blocks 310 and 315, the method 300 continues at block 320 where content selection rules 325 pertaining to the location of the content display device and optionally the time of day are used to analyze the content information so as to determine whether one or more of the programs satisfies the rules. Different rules may apply during different times of the day. The analysis performed at the block 320 may be a combination of rules based selection and mathematical formula where weights are assigned to various categories with higher weights being assigned to more preferred or higher priority content. The weights may be a function of time of day. Details of methods of prioritizing the content selection rules and/or mathematical formula are discussed below in reference to FIG. 4.

An example of a mathematical formula that may be used at the block 320 comprises assigning a numerical value to a content program based on the number of times a keyword or related definition appears in the title and/or description of the content contained in the content information obtained for each program. The mathematical formula may be applied to broadcast content as well a pre-recorded content such as was previously recorded on the content recorder 230 shown in FIG. 2. The mathematical formula may more heavily weight pre-recorded content compared to currently broadcasted content, or vice-versa. The mathematical formula may be derived or modified through data obtained from user testing and focus groups, or from user feedback such as discussed below in reference to Block 345. Skilled technologists will readily identify other mathematical formulas that may be used to assign numerical values based on content type. The program that satisfies the selected rules (or satisfies the most rules) and has the highest numerical value, as determined by the mathematical formula, may be selected (at block 340) to be displayed over other lower valued programs.

If a program is identified at block 320 that satisfies the content selection rules, the process 300 proceeds to optional block 330 where the program that was determined at block 320 to satisfy the rules is recorded. This recorded program can be compared against other pre-recorded programs and currently broadcast programs later on when a power-on signal is received at block 335. In addition to storing the recorded content, information identifying the recorded program and the location or identity of the device in the network where the recorded program is stored may be stored and associated with the recorded program. This program identifying information can be communicated to other content selector devices in the network 100 via the network interface 130 in FIG. 1. In this way, other content selector devices 135 in the network can include the recorded program in the analysis performed at the block 320 for determining a program to display. The content recorder 230 of the content selector 200 can perform the functions at the optional block 330.

At block 335, a power-on signal is received. The power-on signal may be received directly by the input device 235 of the content selector 200, or may be received at the content display device and communicated to the content selector 200 (e.g., with the display control element 225). After receiving the power-on signal at the block 335, the process 300 continues at block 340 where one of the programs determined to satisfy the content selection rules 325 is displayed on the content display device at the location received at the block 310. In one embodiment, the program displayed has the highest value as determined by the mathematical formula as discussed above. In one embodiment, the currently displayed program remains the selected program to be displayed at power-on for an amount of time (for example 10 seconds) after the content display device is powered-off. In other words, if the content display device is turned off and turned on again within 10 seconds, the program that was being displayed is displayed again at the block 340 and not replaced by the currently highest scoring program (that may have been determined at the block 320 while the current program was being displayed). This feature is provided in case the device is accidentally turned off and the user wants to quickly go back to the program that he or she was watching. The communication element 215 and the display control element 225 may perform the functions of communicating the program data to the content display device to be displayed at the block 340.

After the program is displayed at the block 340, the content display device is monitored at block 345. The content display device is monitored to identify a change in the content being displayed (e.g., a channel change command or displaying some other recorded or broadcast content). The monitoring at the block 345 may be performed for a pre-defined amount of time after the content is displayed. If a channel/content change occurs within the pre-defined time, then information associated with the type of content that is currently being displayed can be stored and used to refine the content selection rules used for future channel/content selections. The stored information associated with the channel/content change event can be communicated over the network 100 via the network interface 130 to be used to refine the selection rules 325 used by other content selector devices 135 in the content selection analysis performed at the block 320. In addition to monitoring for a channel/content change event, if the content display device is turned off within the monitoring time period, turn-off information associated with the selected content can also be stored and communicated to other content selector devices. This turn-off information can also be used to modify the content selection rules. The display content monitor 250 can perform the functions at the block 345. It should be noted that some of the blocks of the process 300 may be combined, omitted, rearranged or any combination thereof.

Figure 4:
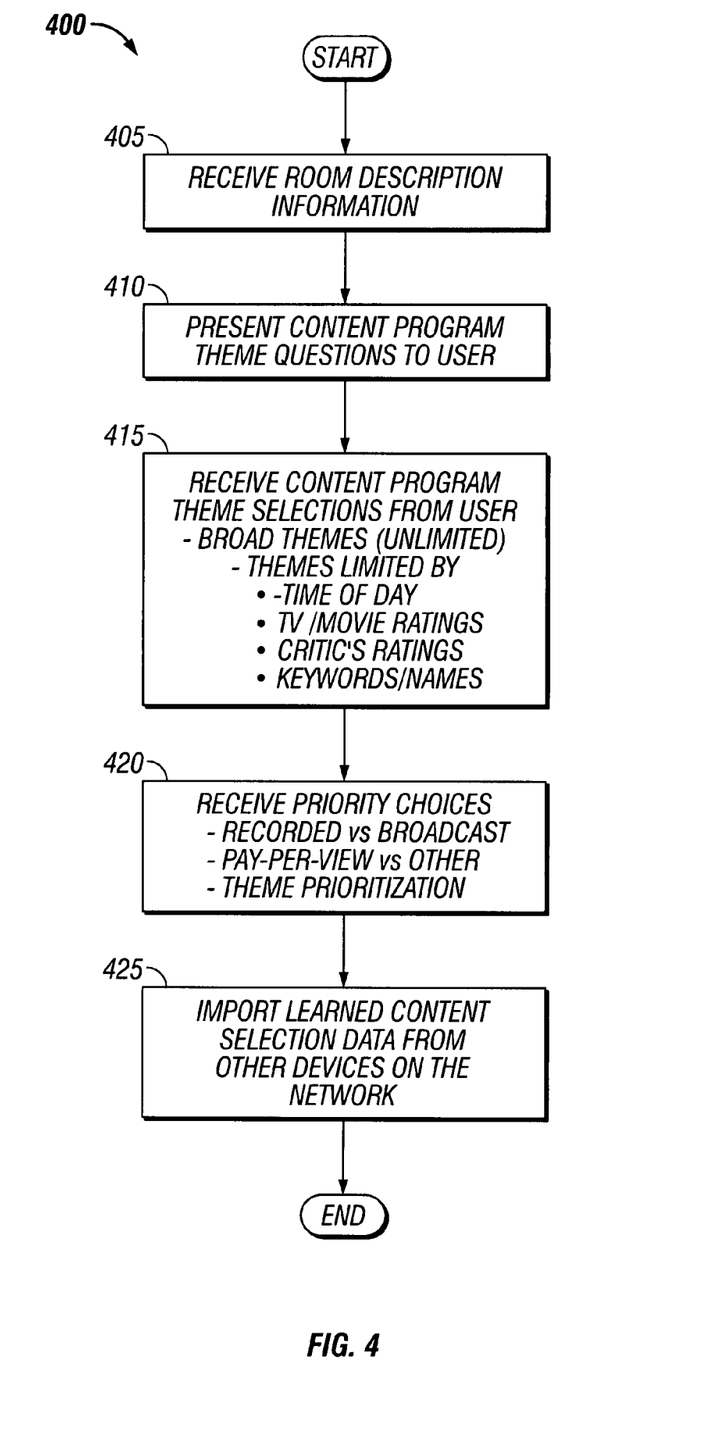
FIG. 4 is a flowchart illustrating an example of a method of generating content selection rules that may be used in the method illustrated in FIG. 3.
Figure 5:
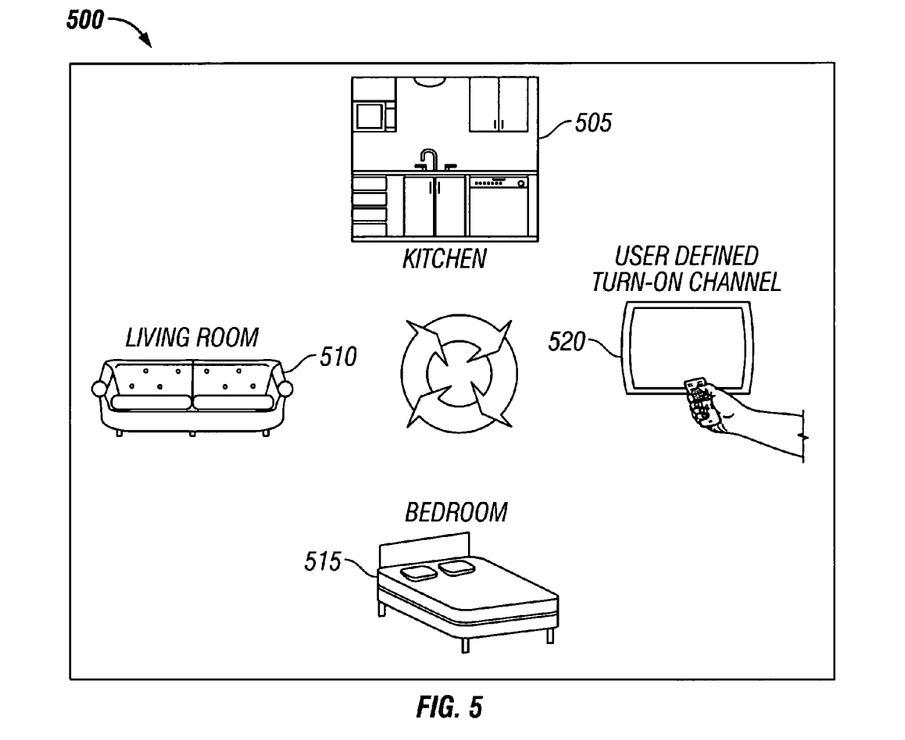
FIG. 5 is an illustration of an example of a graphical user interface display that may be used in the method illustrated in FIG. 4.

FIG. 4 is a flowchart illustrating an example of a method of generating the content selection rules 325 that may be used in the method 300 illustrated in FIG. 3. The method 400 may be performed by the content selector 200 to formulate the content selection rules 325 (and any weighting factors that are used in mathematical formula) that are used to analyze the content information and determine which program(s) to record and/or display. The method 400 starts at block 405 where room description information is received as an input. The room description may be input by a user in response to a graphical user interface (GUI). FIG. 5 is an illustration of an example of a graphical user interface display that may be used in the method 400 illustrated in FIG. 4. The GUI, in this example, presents the user with a menu 500 comprising a plurality of rooms to choose from. The rooms in this example are represented by icons including a kitchen icon 505, a living room icon 510, a bedroom icon 515 and a user specified power-on channel icon 520. The user specified power-on channel icon 520 can be used to specify a room not covered by the other selections. Other room selections may be included in the menu 500. The user can select (e.g., by clicking on an icon with a mouse) the icon that best describes the room where the content display device is located. The input element 235 can perform the functions at the block 405.

Figure 6:
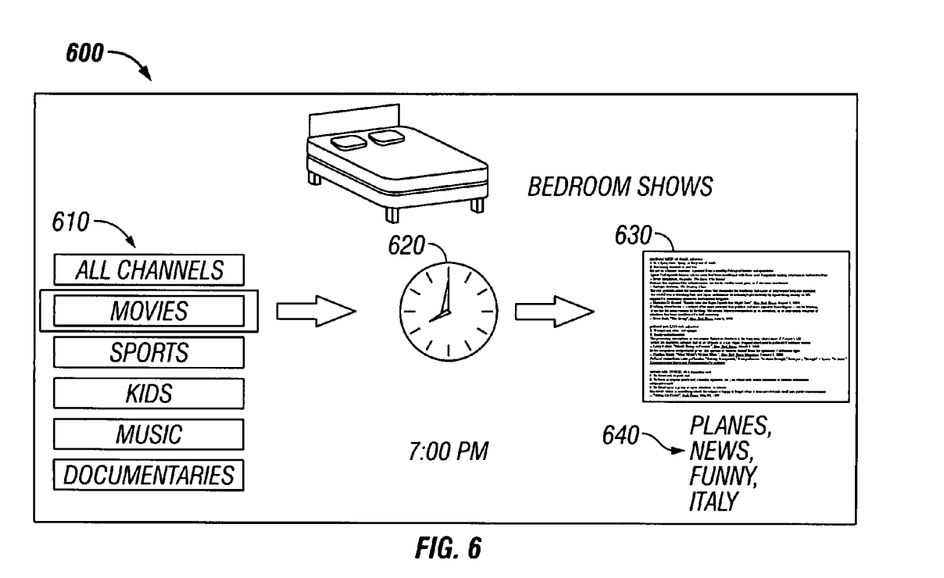
FIG. 6 is an illustration of another example of a graphical user interface display that may be used in the method illustrated in FIG. 4.

After the user selects the room type at the block 405, the method 400 continues at block 410 where a series of one or more questions regarding selection of program themes are presented to the user. The themes may be a default set, or all themes listed in a prioritized order that correspond to the room type that was selected at the block 405 (e.g., sports for a bar, cooking for a kitchen, cartoons for a child's bedroom, etc.). The themes may be presented, for example, in a menu of a GUI. FIG. 6 is an illustration of another example of a graphical user interface display that may be used in the method illustrated in FIG. 4. The menu 600 lists examples of program themes 610 that may be a default set or a set selected by the user for a bedroom location in this example. The themes in this example include all channels, movies, kids, music and documentaries. The questions or choices presented to the user can be used to focus the selection rules to narrow the theme selection so that the content selector can select an ideal program for display at power-on. The themes 610 may be chosen for a certain time of day by the user selecting the clock icon 620 and choosing a time such as 7:00 PM in the example shown. A dictionary icon 630 may be selected by the user to identify keywords 640. The user will select keywords that he or she is interested in such as "planes", "news", "funny" and "Italy" in this example. The keywords 640 may be used to identify content that includes the keywords in the program description. The input element 235 can perform the functions at the block 410.

As the user is presented the series of questions at the block 410, the method 400 proceeds to block 415 where the theme selection answers input by the user are received. The themes may be selected in an unlimited or default fashion or the user may also be presented with questions that narrow the programs that will satisfy his preferred content choices as discussed above. For example, the theme choice may change based on time of day. Television and/or movie ratings may be used to identify programs that are acceptable. For example a child's bedroom may be limited to movie ratings of G only, whereas an adults bedroom may be limited to movies rated G, PG-13, R and/or X. Critics ratings may also be used in the selection rules. The content displayed on power-on may be limited to those programs that receive a minimum (or maximum) rating from critics, such as 3 stars out of a possible 5. The television, movie and/or critics ratings information may be obtained at the block 310 of the method 300 from an EPG or from a data base that may be available on a personal computer such as the personal computer 115 in the network 100 shown in FIG. 1. Other questions know to skilled artisans may be presented at block 410 and the answers received at block 415. The input element 235 can perform the functions at the block 415.

Other questions presented to the user at the block 410 may be associated with priorities used to weight mathematical formula that are used in conjunction with the content selection rules. The answers to these priority related questions are received at block 420. The priorities may include a choice of pre-recorded content over broadcast content. A program that has been previously scheduled on a pay-per-view basis may be given a higher priority than all other programs. Certain themes may be given a higher priority weighting than other themes. In some embodiments, the priorities received at the block 420 are used in calculating the values of the mathematical formula that are used to determine the desired content to be displayed at power-on.

The process 400 continues at block 425 where content selection data obtained from any of the display and/or content selector devices on the network are imported. The imported data can included correct and incorrect content selections that were identified during the monitoring block 345 of the process 300 discussed above. The imported data can be used to modify the selection rules to result in content selections that are more closely correlated to the actual content selections made by the users. As discussed above, the real time information related to channel/content changes that were collected can be shared across the network 100 to multiple content selector devices 135 and content display devices 140 via the network interface 130.

The importing of displayed content information at the block 425 can be performed when content is being displayed or recorded, or at times when no content is being displayed, such as when the display device is off and the displayed content information was previously stored (e.g., using the memory element 210 of the content selector 200).

An example use of the content information imported at the block 425 involves a user who typically moves from a first location such as the living room to a second location such as the bedroom at a predictable or repeated time of day. The content information may be imported from the display device and/or content selector in the living room to the content selector in the bedroom and the bedroom selector device may use the imported information to select the same content depending on priority and rules. If the selection is determined to be correct at the bedroom location (based on a no-content change event), then a correlation is established for that time from a first location, the living room, to a second location, the bedroom, for a particular content selection. A stronger link may be established if a power off to power on occurs at 2 different locations which may have some relationship (e.g., from the living room to the bedroom).

At other times, some content is not desired on multiple content devices. An example of this is a children's pre-recorded movie. Multiple content selector devices may attempt to display the same content across multiple rooms, and the user at the second room changes the content immediately. A negative link is thus established, and/or a previous link may be removed. This behavior is not absolute, but it may be learned by the multiple devices across the network over time and multiple power-on events. These links can also be shared by multiple devices over the network 100.

The questions that are presented to the user at the block 410, and the subsequent rules that are used to determine the program to be displayed at power-on may be fine tuned for different room types through the use of focus groups and user testing to achieve the desired functionality. In some embodiments, the method 400 is performed when the content display device is first powered-on. In other embodiments, the method 400 is performed periodically or when a user selects to refine the content selection rules. It should be noted that some of the blocks of the process 400 may be combined, omitted, rearranged or any combination thereof.

Where the methods and systems discussed above are described in reference to rooms in a home, other settings may also be provided for. For example, a hotel has many different types of rooms such as a hotel lounge, a bar, an exercise room, rooms for guests, multi-room suites, etc. The hotel may also have multiple content sources including cable, satellite, over-the-air, security cameras, media servers, video-on-demand, tourist services, etc. The content selection rules and/or priorities may be selected such that the desired content is displayed on the content display devices at each location from the multiple content sources. For example, if a user is turning on a television in an individual room, the content selector may be designed to favor hotel information, or tourist services. If a display device is powered on at the hotel bar, sports themed programs may be preferred followed by news programs. A multitude of possibilities exist that are known to skilled artisans.

Other settings including virtually any type of networked environment with multiple content sources and distinct locations can be provided for by the methods and systems discussed above. The methods and systems may also be applied in larger environments such as a mall, a stadium, or even a city. Tourist content display devices could be located at multiple points in the city and the timeliest information from multiple sources concerning events at that location could be displayed when the display device is activated by the tourist.

One disclosed embodiment is a system for determining content to display on a content display device at a power-on event, the system including means for displaying programs, first receiving means for receiving content information associated with a plurality of programs that can be received, and second receiving means for receiving location information representative of the location of the displaying means. The system further includes content selection means for analyzing the content information so as to determine whether one or more of the programs satisfies a set of one or more rules, wherein the set of rules pertain to content appropriate for display at the location of the displaying means, third receiving means for receiving a power-on signal at the displaying means, and means for communicating one of the programs determined to satisfy the set of rules to the displaying means after receiving the power-on signal. Aspects may include where the first receiving means receives content information associated with programs available from a plurality of content sources. The system may further include means for recording one of the programs determined to satisfy the set of rules before receiving the power-on signal, where the communicating means communicates the recorded program to the displaying means after receiving the power-on signal. Aspects may include where the second receiving means receives the location information from a user. With reference to FIGS. 1 and 2, aspects of this embodiment include where the displaying means is one of the content display devices 140, where the first receiving means is communication element 215, where the second receiving means is the input element 235, where the content selection means is the content selection element 220, where the third receiving means is the input element 215, where the communicating means is the communication element 215, and where the recording means is the content recorder 230.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of determining content to display on a content display device at a power-on event, the method comprising:
   receiving content information associated with a plurality of programs that can be received;
   receiving location information representative of the location of a content display device in a network;
   presenting, to a user, a series of one or more content theme questions based on the received location information;
   receiving, in response to the one or more questions, user input indicative of one or more content theme selections;
   analyzing the content information so as to determine whether one or more of the programs satisfies the content theme selections, wherein the content theme selections pertain to content appropriate for display at the location of the content display device;
   receiving a power-on signal for the content display device;
   in response to receiving the power-on signal, displaying one of the programs determined to satisfy the content theme selections to the content display device;
   monitoring the content display device for identifying a change in the displayed program; and
   storing information for the change in the displayed program and refining content selection of appropriate content for displaying on the content display device.

2. The method of claim 1, wherein the content information is associated with a plurality of content sources.

3. The method of claim 2, wherein the plurality of content sources comprise one or more of a cable network, a satellite network, an over the air network, and a recorded content source.

4. The method of claim 1, wherein the received location information represents a room within a home.

5. The method of claim 1, further comprising, before receiving the power-on signal, recording one of the programs determined to satisfy the content theme selections.

6. The method of claim 5, wherein the recorded program is communicated over data communication network to the content display device after receiving the power-on signal.

7. The method of claim 1, wherein the location information is input by a user.

8. The method of claim 1, further comprising:
   receiving an indication of a time of day; and
   analyzing the content information so as to determine whether one or more of the programs satisfies a set of rules that pertains to content appropriate for display at the received time of day;
   wherein the program displayed at the content display device satisfies the set of rules.

9. The method of claim 1, further comprising:
   monitoring the display device after displaying one of the programs, the monitoring to identify a change in the content being displayed; and
   storing information related to the content being displayed after the change.

10. The method of claim 1, wherein a program is selected for displaying on the content display device based on one or more of viewer content rating and program quality rating.

11. The method of claim 1, wherein a program is selected for displaying on the content display device based on user priority settings comprising priorities of: pre-recorded programming, currently broadcast programming and pay per view programming.

12. The method of claim 1, further comprising:
   importing content selection data from any content display of content selector devices in the network, wherein the imported content selection data comprises correct or incorrect content selections determined during said monitoring.

13. The method of claim 1, further comprising:
   determining if the program displayed on the content display device is turned off within a predetermined time period.

14. The method of claim 13, further comprising:
   upon determining that the program displayed on the content display device is turned off:
   storing the turn off information; and
   communicating the information to content selector devices in the network.

15. A system for determining content to display on a content display device at a power-on event, the system comprising:
   a content display device configured to for displaying audio-visual data;
   a receiver communicates with the content display device and receives content information associated with a plurality of programs that are received over a network interface in a local network; and
   a content selection subsystem for communicating with the receiver in the local network for receiving location information representative of the location of the content display device, and for analyzing the content information for determining whether one or more of the programs satisfies a set of one or more rules pertaining to content appropriate for display at the location of the content display device, the content selection subsystem further monitors the content display device and identifies a change in the displayed program, stores information for the change in the displayed program, and refines content selection of appropriate content for displaying on the content display device;
   wherein the content display device presents, to a user, a series of one or more content theme questions based on the received location information and wherein the receiver receives, in response to the one or more questions, user input indicative of one or more content theme selections;
   wherein the receiver further receives a power-on signal associated with the content display device, and, after receiving the power-on signal, communicates a program that satisfies the content theme selections to the content display device.

16. The system of claim 15, wherein the programs are associated with a plurality of content sources that can be accessed over the network interface.

17. The system of claim 16, wherein the plurality of content source comprise broadcast programs and available content in the local network.

18. The system of claim 15, wherein the received location information represents a room within a home.

19. The system of claim 15, further comprising a content recorder for communicating with the receiver, and, before receiving the power-on signal, records a program that satisfies the content theme selections.

20. The system of claim 19, wherein the receiver communicates the recorded program to the content display device after receiving the power-on signal.

21. The system of claim 15, further comprising an input device that operates to receive the location information from a user.

22. The system of claim 15, further comprising:
a timing device indicating a time of day; and
wherein the content selection subsystem analyzes the content information and determines whether one or more of the programs satisfies a set of rules that pertains to content appropriate for display at the indicated time of day, and wherein the program displayed at the content display device satisfies the set of rules.

23. The system of claim 15, wherein the content selection subsystem monitors the display device after the program that satisfies the content theme selections is communicated to the display device, identifies a change in the content being displayed, and stores information related to the content being displayed after the change.

24. A system for determining content to display on a content display device at a power-on event, the system comprising:
a plurality of content display devices for displaying audio-visual data in a network;
a receiver communicating with the content display device, wherein the receiver receives content information associated with a plurality of programs received over a network interface; and
a plurality of content selectors communicating with the receiver, wherein at least one content selector receives location information representative of the location of the content display device, and analyzes the content information for determining whether one or more of the programs satisfies a set of one or more rules pertaining to content appropriate for display at the location of the content display device, the content selector further monitors the content display device and identifies a change in the displayed program, stores information for the change in the displayed program, and refines content selection of appropriate content for displaying on the content display device, wherein a program is selected for displaying on the content display device based on one or more of viewer content rating and program quality rating, content selection data is imported from any content display or content selector device in the network, and wherein the imported content selection data comprises correct or incorrect content selections determined during by monitoring the content display device,
wherein the receiver receives a power-on signal associated with the content display device, and, after receiving the power-on signal, communicates a program that satisfies the content theme selections to the content display device.

25. A method of determining content to display on a content display device at a power-on event, the method comprising:
prior to receiving a power-on event by a content display-device:
employing a content selector device for:
receiving content information associated with a plurality of content available in a home network;
receiving location information representative of the location of a content display device in the home network;
presenting, to a user, a series of one or more content theme questions based on the received location information, wherein the series of one or more content theme questions are associated with priorities used to weight mathematical formula, wherein the priorities include a choice of pre-recorded content over broadcast content;
receiving, in response to the one or more questions, user input indicative of one or more content theme selections;
analyzing the content information so as to determine whether one or more of the available content satisfies the content theme selections, wherein the content theme selections pertain to available content appropriate for display at the location of the content display device;
upon receiving a power-on signal for the content display device:
the content display device displaying one of the content determined to satisfy the content theme selections.

* * * * *